United States Patent
Brown et al.

(10) Patent No.: US 8,230,391 B2
(45) Date of Patent: Jul. 24, 2012

(54) CORRELATING EVENTS EMITTED BY SOFTWARE COMPONENTS

(75) Inventors: Michael Wayne Brown, Georgetown, TX (US); Friedemann Schwenkreis, Leinfelden-Echterdingen (DE)

(73) Assignee: International Business Machines Corporation, Armonk, NY (US)

(*) Notice: Subject to any disclaimer, the term of this patent is extended or adjusted under 35 U.S.C. 154(b) by 1324 days.

(21) Appl. No.: 11/868,679

(22) Filed: Oct. 8, 2007

(65) Prior Publication Data

US 2008/0092118 A1    Apr. 17, 2008

(30) Foreign Application Priority Data

Oct. 13, 2006   (EP) .................................... 06122257

(51) Int. Cl.
G06F 9/44    (2006.01)
(52) U.S. Cl. ........................................................ 717/120
(58) Field of Classification Search ........... 717/106–134
See application file for complete search history.

(56) References Cited

U.S. PATENT DOCUMENTS

| 6,629,106 | B1 * | 9/2003 | Narayanaswamy et al. .......... 1/1 |
| 7,275,250 | B1 * | 9/2007 | Novik et al. .................. 719/318 |
| 7,441,234 | B2 * | 10/2008 | Cwalina et al. ............... 717/128 |

OTHER PUBLICATIONS

IBM "WebSphere Application Server for z/OS Version, 6.0.1—Troubleshooting and Support", Mar. 2005, IBM Corp., chapters: 1-5, pp. 1-232.*

* cited by examiner

Primary Examiner — Ted T Vo
(74) Attorney, Agent, or Firm — Thomas E. Lees, LLC

(57) ABSTRACT

The present invention improves correlation of events emitted by software components during a thread of execution. Each software component invoked during the thread registers with a correlation information manager associated with the thread of execution and then deregisters from said correlation information manager when it ceases to participate in the thread. The correlation information manager stores registered software components in a stack structure. Whenever an event is to be emitted by a software component, the associated correlation information manager provides explicit correlation information that identifies at least the software component that emitted the most recent event in the thread and all software components that registered with the correlation information manager after the software component that emitted the most recent event and that are still registered.

10 Claims, 6 Drawing Sheets

CORRELATING EVENTS EMITTED BY SOFTWARE COMPONENTS

BACKGROUND OF THE INVENTION

In general, the present invention relates to the correlation of events emitted by software components.

Events are special messages that are emitted or published by software components, called emitters, to indicate a state change during operations of the emitting component. Events are consumed by other components, called consumers. Consumers retrieve events by subscribing or registering with the event infrastructure. Thus, there is no pre-defined relationship between emitting and consuming components. One example of a consumer is a monitoring tool that observes the performance of a system.

If a state change in a particular component is detected by a consumer, there are scenarios in which the consumer is interested in finding previously indicated state changes of other components which have a causal relationship with the current state change. Usually, a prerequisite for a causal relationship between two events $E_A$ and $E_B$ of component A and component B, where $E_B$ is consumed after $E_A$, is the fact that component A has either directly or indirectly invoked component B. In other words, there is a call chain from A to B. Thus, a consumer needs to be able to determine from the events whether there is a call chain or not.

The diagram of FIG. 1 illustrates a synchronous call chain of emitting components with their associated events for entry and exit of a component. Depicted is a call sequence of components using an SCA (Service Component Architecture) infrastructure. A first task A calls a process B using the SCA component B. The process B then calls a sub-process C using SCA component C, The process C then calls the JCA connector (a connector according to the Java Connector Architecture specification) D using SCA component D. Whenever a component is called or entered, an entry event is emitted. Whenever the work of a component is finished, an exit event is emitted. This leads to the event sequence that is depicted on the right hand side if the scenario is observed after the execution.

Consider this scenario from a consumer perspective. For example, a consumer receives the event "Entry JCD" and would like to be able to find on behalf of which component the component JCD has been called. For that purpose it would be necessary to correlate the event "Entry HTA" with the event "Entry JCD".

The usual approach to correlate events is to use the timestamps of the events. The timestamps allow calculating the "distance in time" which helps to decide whether events can be correlated at all. However, for environments in which there are multiple concurrent threads of execution, the frequent timestamps of events occurring in different threads does not support a correlation of events.

There are basically two approaches based on explicit correlation information in events that can be used to determine the correlation of events: a strongly linked approach and a weakly linked approach.

The principle of the strongly linked approach is that all involved components of a call chain can be identified in each event. In the example, illustrated by FIG. 1, that would mean, for instance, that the events of the JCA connector D would need to carry the identification of the SCA component D, the BFM (Business Flow Manager) process C, the SCA component C, the BFM process B, the SCA component B, and the HTM (Human Task Manager) task A. Hence, a single event supports determination of the complete call chain.

The weakly linked approach is based on the idea of minimizing the necessary correlation information in the events. The weakly linked approach only requires the identification of the current component plus the identification of the calling component in the event. However, each component needs to emit events in order to enable consumers of the events to detect the call chain. In the given example, an event of the JCA connector D carries the identification of the connector component itself plus the identification of the calling component, which would be the SCA component D. Events of the SCA component D would need to include the identification of the SCA component D and the BFM process C and so on and so forth. By receiving all the events with the direct caller/callee information, the transitive caller/callee relationship can be calculated.

Usually, in case of business level monitoring, the SCA component events are not of interest. Thus, one would only emit events for the Task A, the Process B, the Process C, and the JCA Connector D. However, this is not possible in the weakly linked case, because both the caller correlation and the callee correlation identification always need to be emitted in an event. If, for example, SCA component D does not emit an event, then there is no information contained in the events that SCA component D was invoked by Process C. Thus, it is impossible to determine that JCA D was actually invoked on behalf of Process C. As a result, in the example case, 14 events with a constant correlation header size of 2 entries need to be emitted.

Using the strongly linked case avoids emitting the SCA component events that result in 8 events. However, the strongly linked events need to carry the correlation information of all involved components so far which means n/2 times correlation identifiers on average if n is the number of involved components in the call chain. The example ends up with an average of four identifications in events. Thus, the number of necessary events is significantly reduced compared to the weakly linked case but significant additional load is added to the events, which again causes an undesirable load on the event infrastructure.

BRIEF SUMMARY OF THE INVENTION

The present invention may be implemented as a method for correlating events emitted by a set of software components participating in a thread of execution. The method is implemented in a correlation information manager. Each software component participating in the execution thread is registered to create a set of correlation information. The correlation information is stored in the correlation information manager. At least some of the stored information is provided to a software component that subsequently emits an event during the thread of execution.

The invention may also be implemented as a data processing system for correlating events emitted by one or more software components participating in a thread of execution. The system includes a correlation information manager and has a registration module for registering and de-registering software components participating in the associated thread of execution. An event receiver receives events emitted by registered software components. A stack manager creates a set of correlation information that includes an identifier of the software component that emitted the latest received event and identifiers for all software components that registered with the correlation information manager after the component that emitted the latest received event, assuming the components are still registered. A communication manager transmits events together with correlation information to a consumer.

Finally, the invention may be implemented as a computer program product for correlating events emitted by software components participating in a thread of execution in a multi-threaded system. The computer program product includes a computer usable medium embodying computer usable program code. Computer usable program code is configured to register each software components participating in the execution thread to create a set of correlation information, to store the created set of correlation information, and to provide at least some of the stored information to a software component subsequently emitting an event during the execution thread.

DETAILED DESCRIPTION OF THE INVENTION

Figure 1:
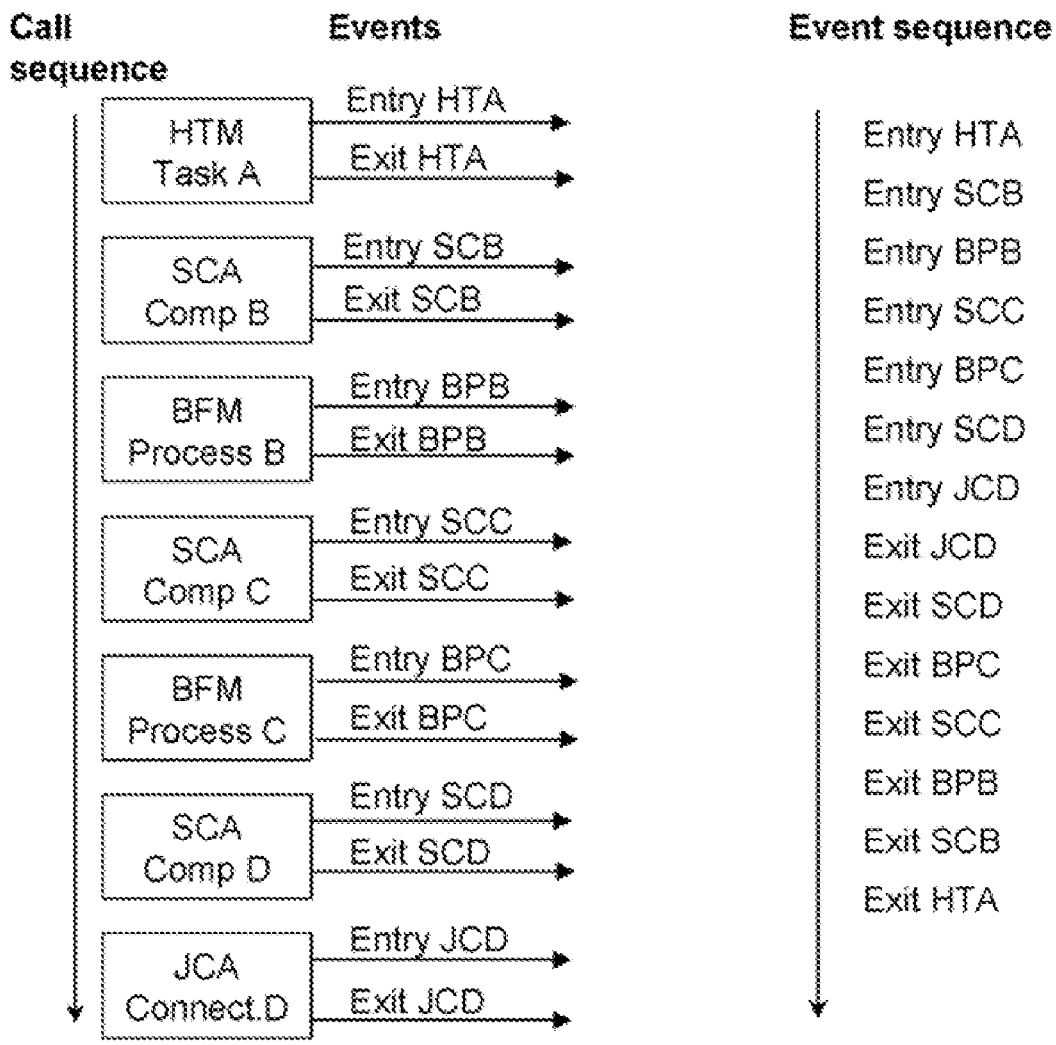
FIG. 1 is a diagram illustrating a synchronous call chain of emitting components with their associated events for entry and exit of a component.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server, in the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention are applicable in multiple service oriented infrastructures, such as workflow systems. Enterprise Java Beans (EJB) environments or Service Component Architecture (SCA) environments. A data processing system in accordance with the invention may thus support a service oriented infrastructure. It is appreciated that embodiments of the present invention may be applicable also in other data processing systems for correlation of events.

Figure 2:
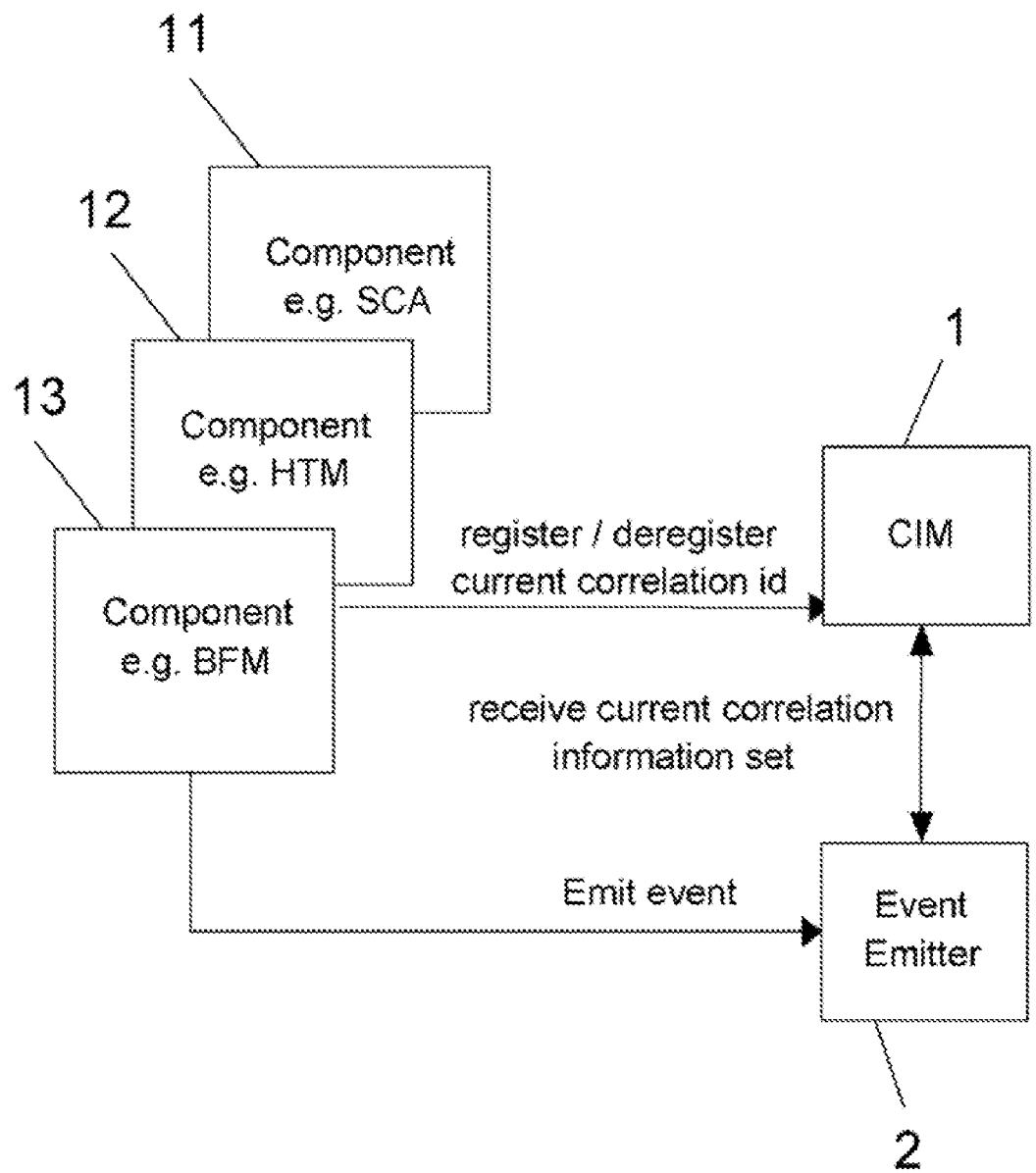
FIG. 2 is a diagram illustrating the functioning of a correlation information manager or CIM.

The scenario shown in FIG. 1 and explained above represents the starting point for the description of a correlation information manager CIM with reference to FIG. 2. The call sequence shown in FIG. 1 represents a thread of execution. According to the invention, a correlation information manager CIM is created for each thread of execution. FIG. 2 shows a CIM 1 associated to the call sequence shown in FIG. 1.

Each participating software component 11, 12, 13 registers with the CIM 1 by passing its identifier to the CIM 1 whenever the software component is invoked on behalf of the call sequence. The registration occurs before the point in the execution at which the software component 11, 12, 13 would emit an entry or start event and occurs regardless whether an event is actually emitted or not. Furthermore, each software component 11, 12, 13 also deregisters when it ceases to participate in the processing. Deregistration occurs immediately after the point in time when the software component 11, 12, 13 would emit an end or exit event. Again, it does not matter whether such an event is actually emitted or not.

Thus, the CIM 1 is able to provide each event to be emitted with explicit correlation information. For example, an Event Emitter 2 receives a current set of correlation information from the CIM 1 whenever an event is to be emitted by a software component 11, 12, 13. This current correlation information set is added to the event as explicit correlation information and includes at least the identifier of the most recently emitting software component in the thread of execution and the identifiers of all software components that registered with said CIM 1 after said last emitting software component and that are still registered.

Emitting of events and inclusion of correlation information for the events is also schematically shown in the example in FIG. 2. When the software component 13 emits an event, it forwards the event to the Event Emitter 2. The Event Emitter 2 then informs the CIM 1 of the identifier of the software component 13. This way the CIM 1 can keep track of the software component that emitted the most recent event. This information is updated after correlation information for the present event has been provided. The Event Emitter 2 retrieves or receives correlation information from the CIM 1 for the present event. The correlation information is added to the event in the Event Emitter 2 or otherwise sent forward together with the event from the Event Emitter 2.

Figure 3:
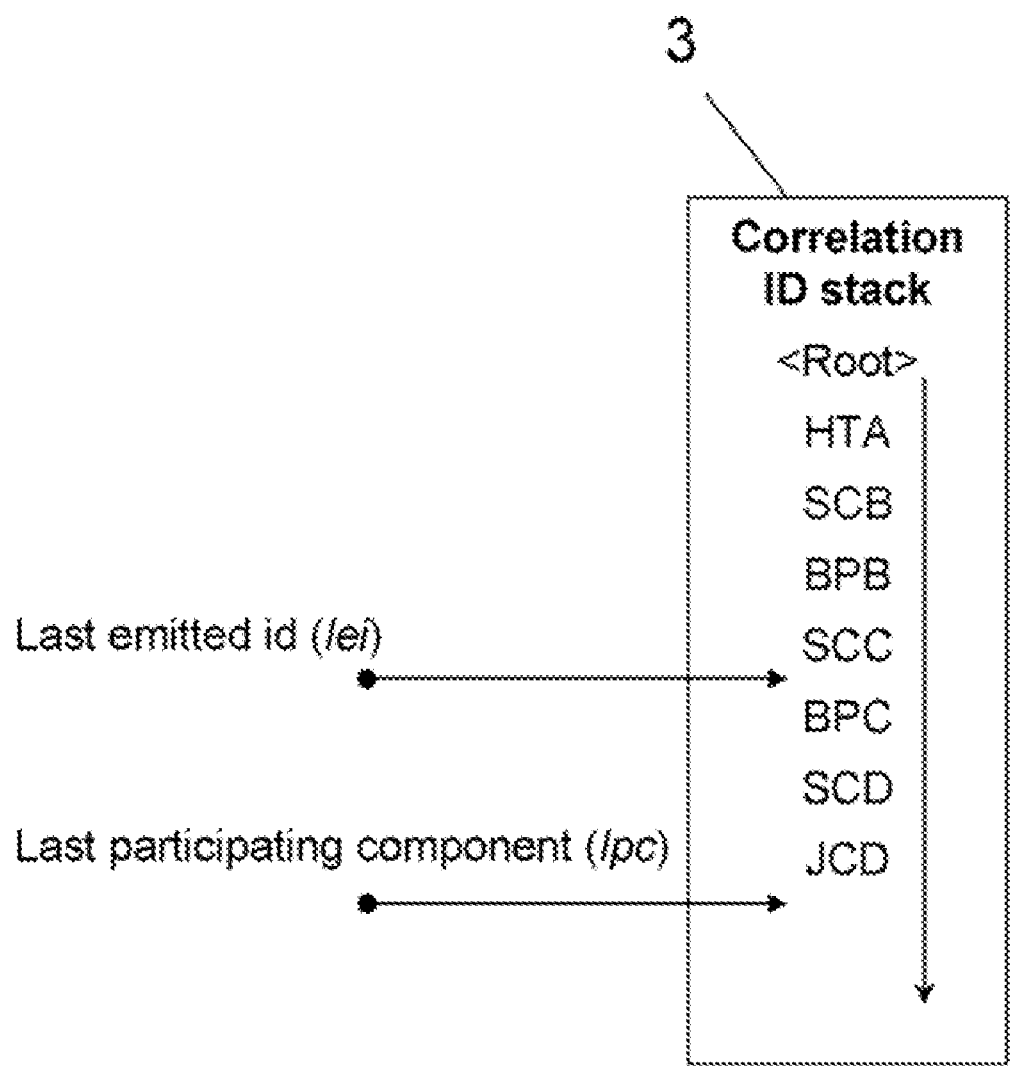
FIG. 3 is a diagram illustrating the data structure of a correlation ID stack maintained by the CIM associated to the call chain of FIG. 1.

The CIM 1 maintains a stack of correlation identifiers, also called a correlation identifier (ID) stack, the structure of which is illustrated as element 3 in FIG. 3.

The correlation ids of the registered software components are stored in a simple volatile stack structure. As mentioned above, there needs to be one CIM 1 and, consequently, one such stack structure for each thread of execution. Two pointers to elements on the stack are also maintained. The "last emitted id" (lei) pointer references the highest correlation id on the stack that was contained in an emitted event. The "last participating component" (lpc) pointer references the top of the stack.

The initial situation is that the stack of correlation ids of a thread of execution is empty except for a special id <Root>, Both the lei and the lpc pointer point to that special id <Root> element of the stack. At this stage no events can be emitted because no software component has been registered with the CIM 1. When the thread of execution is initiated as a synchronous call chain by invoking the software component HTM Task A, that software component registers with the CIM 1 by passing its correlation id HTA to the CIM 1. The CIM 1 pushes the id onto the stack and advances the lpc pointer to point to the new top-level element. In the same way, the correlation ids SCB, BPB, SCC, BPC, SCD and JGD of the corresponding software components are subsequently stored sequentially until the last software component invoked, JCA Connector D, exits processing. Whenever a software component has finished its work on behalf of the thread of execution, it initiates deregistration from the CAM 1. CAM 1 then removes the correlation id from the top of the stack and sets the lpc pointer to reference to the new top-level element of the stack.

Figure 4:
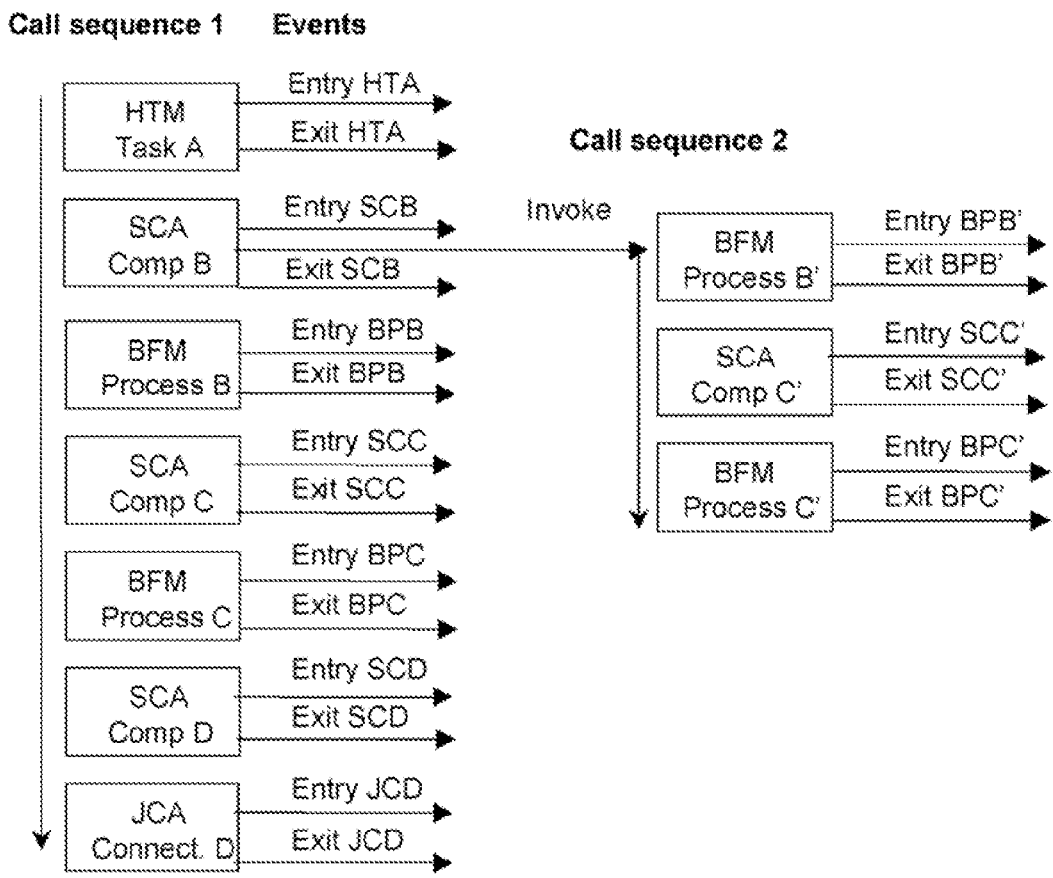
FIG. 4 is a diagram illustrating an asynchronous call chain resulting in two parallel threads of execution.
Figure 4:
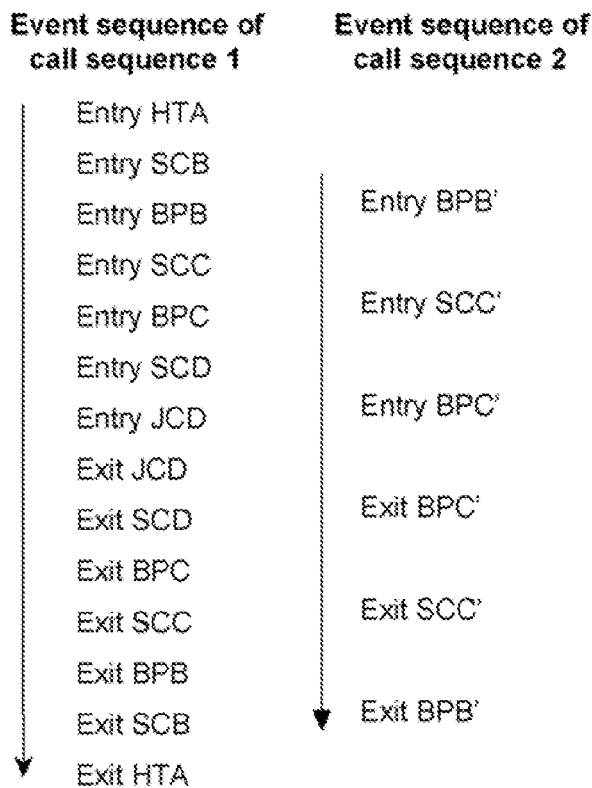
Figure 5:
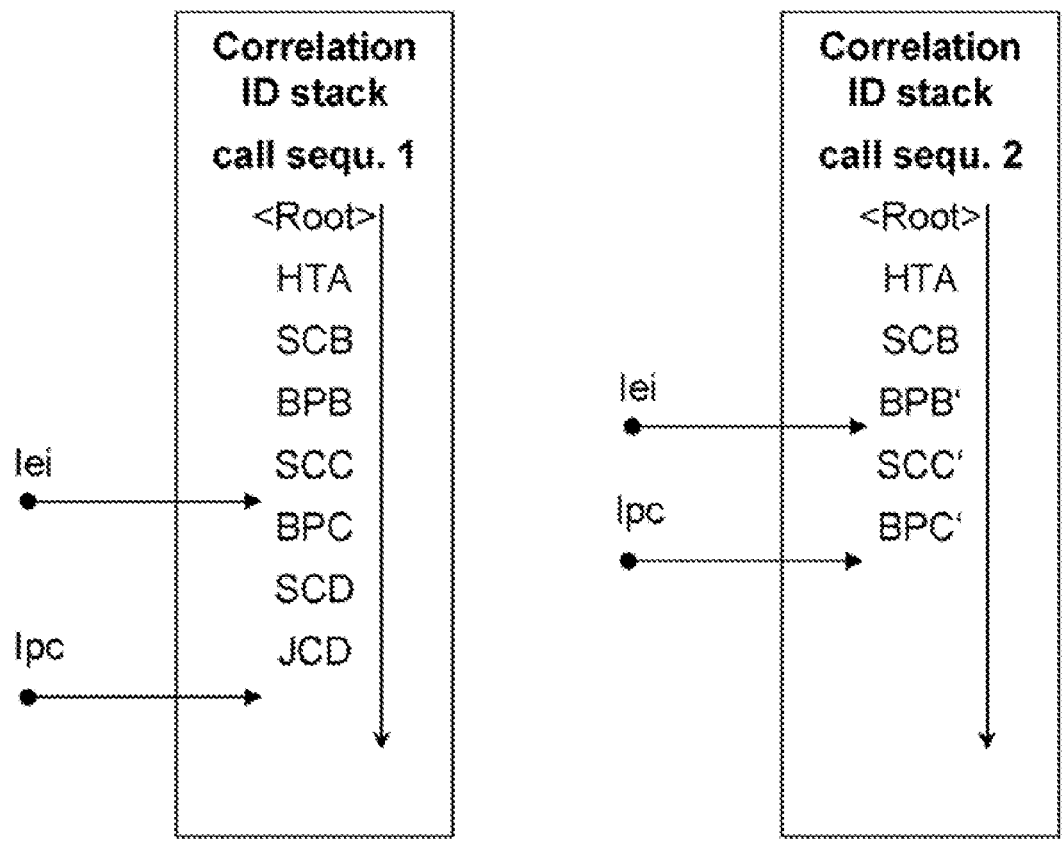
FIG. 5 is a diagram illustrating the corresponding correlation ID stacks.

An example for an asynchronous call chain resulting in two parallel threads of execution is illustrated by FIGS. 4 and 5.

On the left hand side of FIG. 4, a call sequence 1 of software components is depicted that corresponds to the call sequence of FIG. 1 except for one difference relating to SCA Component B. This software component executes not only a synchronous call invoking BFM Process B but also an asynchronous call invoking BFM Process B'. As a consequence, a second call sequence 2 of software components BFM Process B', SCA Component C' and BFM Process C' is initiated, which is depicted on the right hand side of FIG. 4. Resulting event sequences are shown below the call sequences 1 and 2. It cannot be predicted how call sequence 1 and call sequence 2 interrelate. However, the entry event of BPB' will be emitted after the entry event of SCB.

FIG. 5 shows the correlation id stacks of the CIMs associated to call sequence 1 and to call sequence 2, The correlation id stack of call sequence 1 is depicted on the left hand side of FIG. 5 and is identical to the correlation id stack shown in FIG. 3. The correlation id stack of call sequence 2 is shown on the right hand side of FIG. 5. As call sequence 2 was initiated by an asynchronous call of SCA Component B, first, the contents of the correlation id stack of the caller is copied to the new correlation id stack before registration of BFM Process B' by storing its identifier on top of the copied correlation ID stack and advancing the lpc pointer to this new top-level element Then, the correlation ids SCC' and BPC' are stored as described earlier with reference to FIG. 3.

Figure 6:
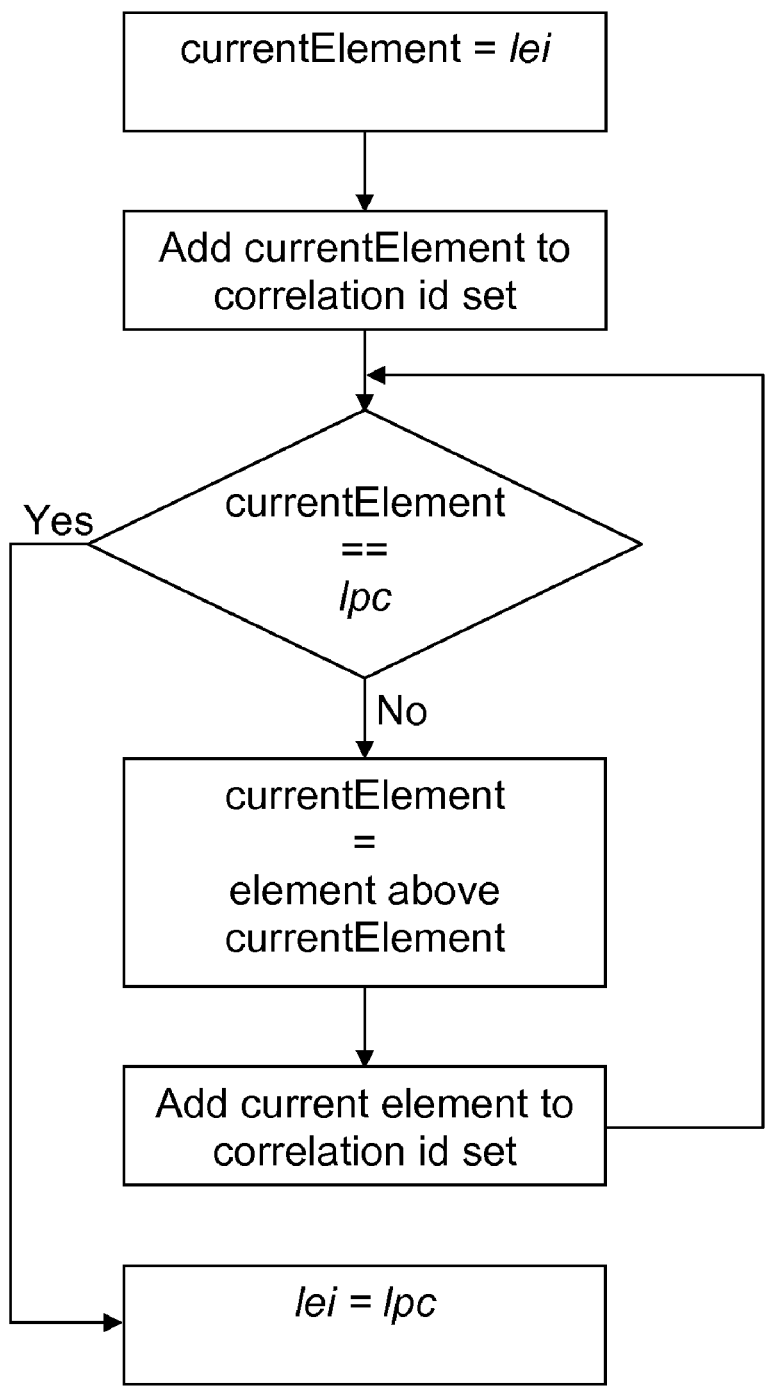
FIG. 6 is a flowchart, for determining the explicit correlation information to be added to an event by using a correlation ID stack as shown in FIG. 3 or 5.

As mentioned before, whenever an event is emitted by a software component, the corresponding CIM is invoked and advances a lei pointer to the identifier of said software component in the correlation ID stack. Additionally, the CIM determines the necessary correlation information that has to be written into the event. In case of the described example, this explicit correlation information is retrieved from the correlation id stack by returning all elements between the lpc pointer and the lei pointer, including the elements to which the lpc pointer and the lei pointer point. The lei pointer is then set to reference the same element as the lpc pointer. This method is illustrated by the flowchart of FIG. 6.

The management of the lei pointer can be changed such that it is not set to the lpc pointer during the event emission but to an element within a specifiable distance of the lpc pointer. If, for example, a distance of one element is defined, then the events will always carry the correlation ids of the current component and the caller component. If the number of additional elements is increased, then even more calling components can be identified just by reading a single event. This concept can be used to introduce a certain degree of redundancy to allow meaningful event interpretation in case of lost events. However, this increased "robustness" may require more bandwidth in the event infrastructure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. If will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof it will be apparent that modifications and variations are possible without departing from the scope of the invention defined in the appended claims.

What is claimed is:

1. A method for correlating events emitted by a set of software components participating in an execution thread, said method being performed by a correlation information manager and comprising:
    registering each software component participating in the execution thread to create a set of correlation information by:
        receiving an identifier of said software component;
        storing the identifier on top of a correlation identifier stack; and
        advancing, using a processor, a stack pointer indicating the most recently registered component in the stack;
    storing said set of correlation information;
    de-registering a software component when the software component ceases to participate in the execution thread; and
    providing at least some information from said stored set of correlation information to a software component subsequently emitting an event during the execution thread, wherein providing at least some information further comprises providing an identifier of the software component that emitted the latest event in the execution thread and identifiers of all software components that were registered after the software component that emitted the most recent event and that have not been de-registered.

2. The method according to claim 1 wherein de-registering a software component when the software component ceases to participate in the execution thread further comprises:
    removing the identifier for the software component being de-registered from the correlation identifier stack; and
    moving the stack pointer to the next software component identified in the stack.

3. The method according to claim 1 further comprising registering, at a new correlation information manager, a software component participating in a new execution thread by:
    receiving a copy of said set of correlation information at a new correlation information manager associated to the new execution thread;
    receiving an identifier of the software component at the new correlation information manager;
    storing the identifier on top of a stack maintained by the new correlation information manager; and
    advancing a pointer to the identifier stored at the top of the maintained stack.

4. A data processing system for correlating events emitted by one or more of a plurality of software components, said system including, for each thread of execution in the system, a correlation information manager comprising:
    a registration module for registering and de-registering software components participating in the associated thread of execution, wherein the registration module:
        receives an identifier of said software component;
        stores the identifier on top of a correlation identifier stack;
        advances a stack pointer indicating the most recently registered component in the stack; and
        de-registers a software component when the software component ceases to participate in the execution thread;
    an event receiver for receiving an event emitted by a registered software component;
    a stack manager for creating a set of correlation information comprising an identifier of the software component that emitted the latest event in the execution thread and identifiers of all software components that were registered after the software component that emitted the most recent event and that have not been de-registered; and
    a communications manager for transmitting events together with created correlation information to a consumer.

5. The data processing system according to claim 4 wherein the registration module registers a software component participating in the associated thread of execution prior to the time at which the registered software component would first emit an event.

6. The data processing system according to claim 5 wherein the registration module de-registers a software component only after the software component has ceased to participate in the thread of execution.

7. The data processing system according to claim 5 wherein the registration module registers a software component by processing an event emitted by the software component.

8. A computer-readable storage device with an executable program for correlating events emitted by a set of software components participating in an execution thread in a multi-threaded system stored thereon, wherein the program instructs a processor to:

register each software component participating in the execution thread to create a set of correlation information, wherein the program code instructs the processor to:
  receive an identifier of said software component;
  store the identifier on top of a correlation identifier stack; and
  advance a stack pointer indicating the most recently registered component in the stack;
de-register a software component when the software component ceases to participate in the execution thread;
store said set of correlation information in said correlation information manager, and
provide at least some information from said stored set of correlation information to a software component subsequently emitting an event during the execution thread, wherein the executable program to instruct the processor to provide at least some information from the stored set of correlation information comprises an executable program to instruct the processor to provide an identifier of the software component that emitted the most recent event in the execution thread and identifiers of all software components that were registered after the software component that emitted the most recent event and that have not been de-registered.

9. The computer-readable storage device according to claim 8, wherein the executable program instructions to de-register a software component when the software component ceases to participate in the execution thread further comprises instructions to:
  remove the identifier for the software component being de-registered from the correlation identifier stack; and
  move the stack pointer to the next software component identified in the stack.

10. The computer-readable storage device according to claim 8, wherein the executable program further instructs the processor to register, at a new correlation information manager, a software component participating in a new execution, wherein the program instructs the processor to:
  receive a copy of said set of correlation information maintained at an existing correlation information manager associated to the new execution thread;
  receive an identifier of the software component at the new correlation information manager;
  store the identifier on top of a stack maintained by the new correlation information manager; and
  advance a pointer to the identifier stored at the top of the stack maintained by the new correlation information manager.

* * * * *